Nov. 6, 1962  D. W. LYSETT  3,061,922
METHOD OF CLUTCH ASSEMBLY
Filed Dec. 14, 1956  5 Sheets-Sheet 1

Inventor:
Daniel W. Lysett
By:
Donald W. Banner Atty.

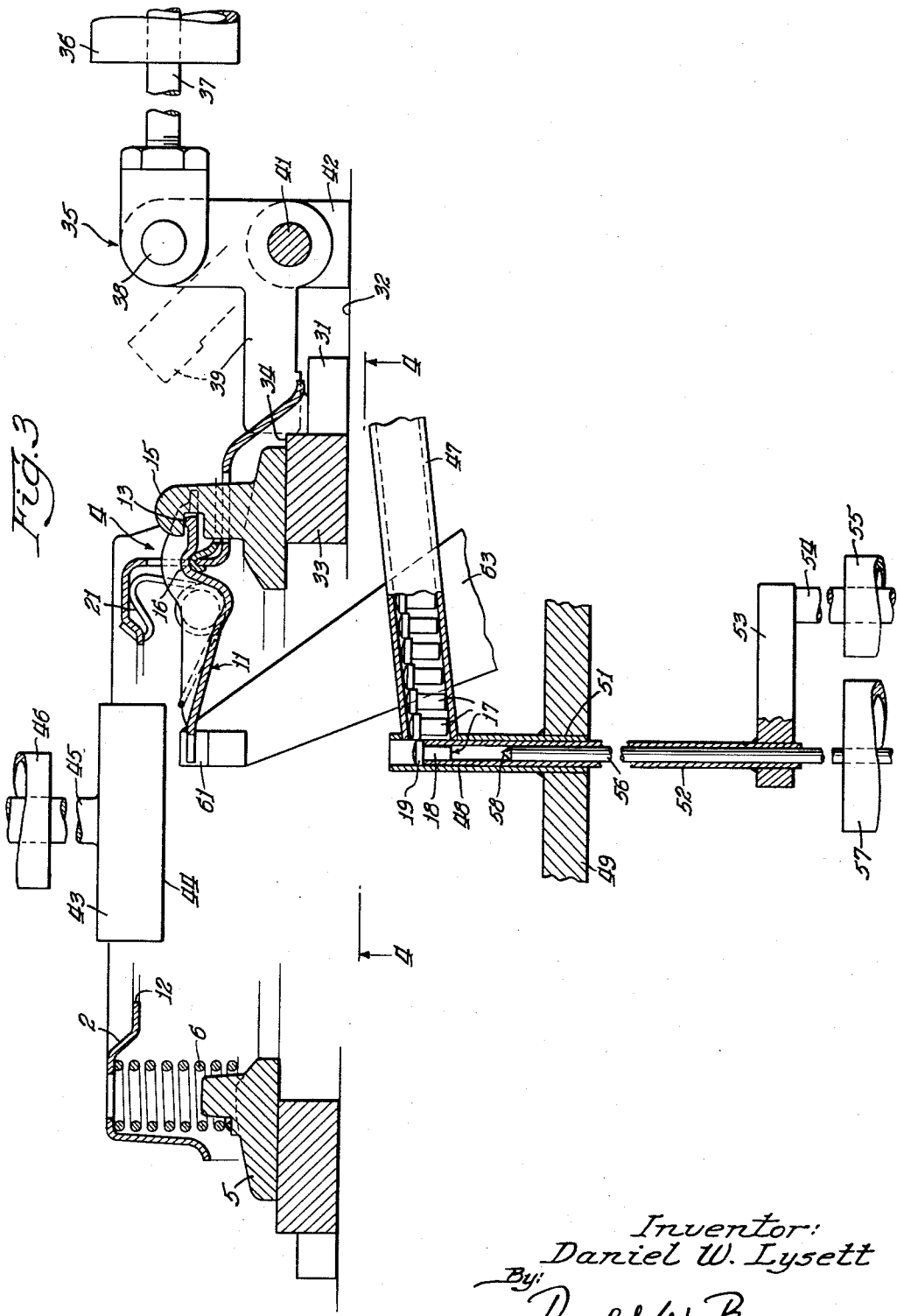

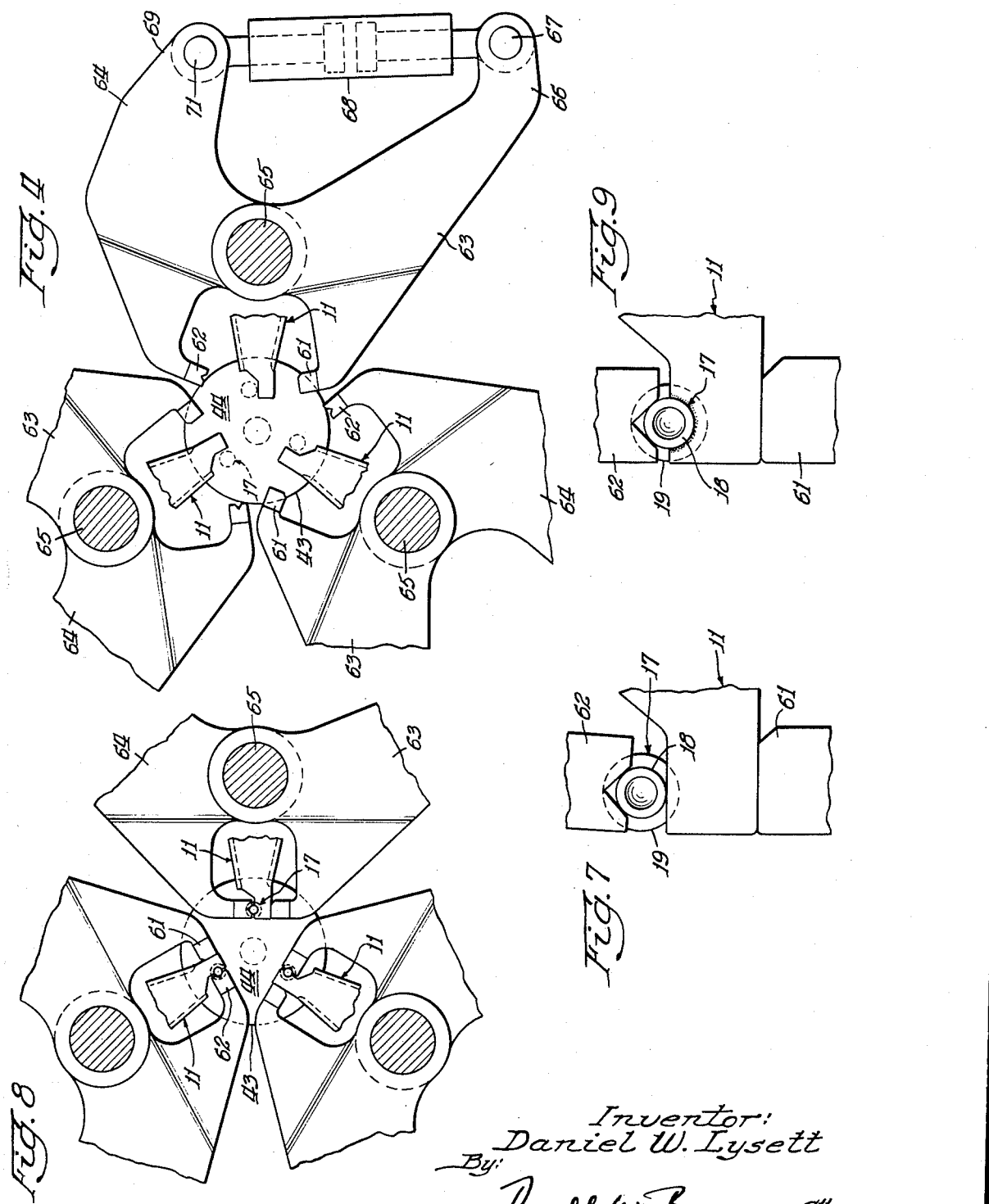

Nov. 6, 1962   D. W. LYSETT   3,061,922
METHOD OF CLUTCH ASSEMBLY
Filed Dec. 14, 1956   5 Sheets-Sheet 4
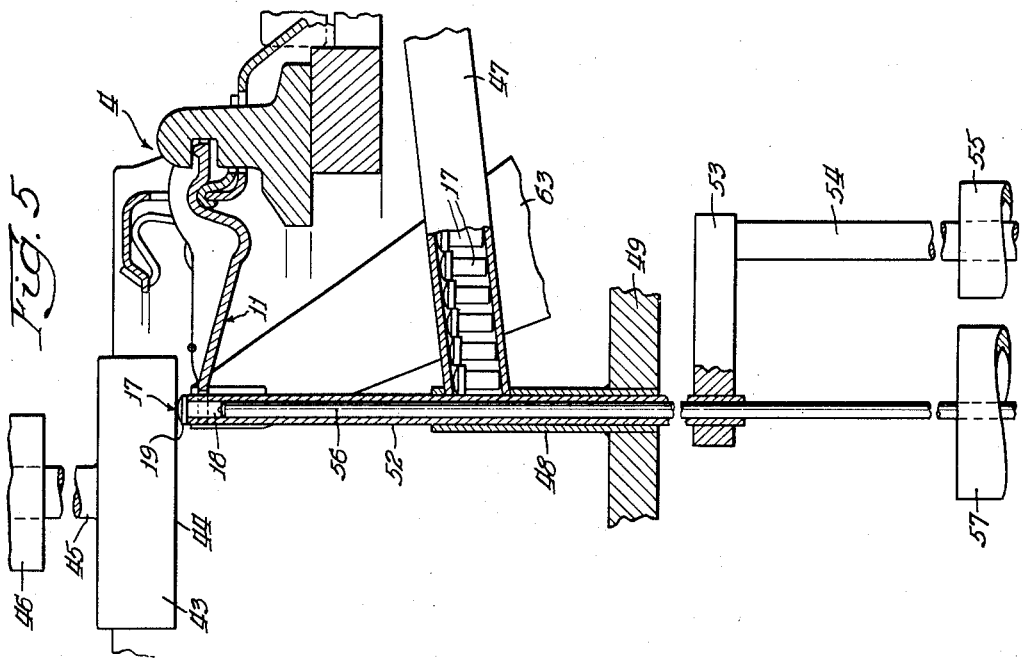
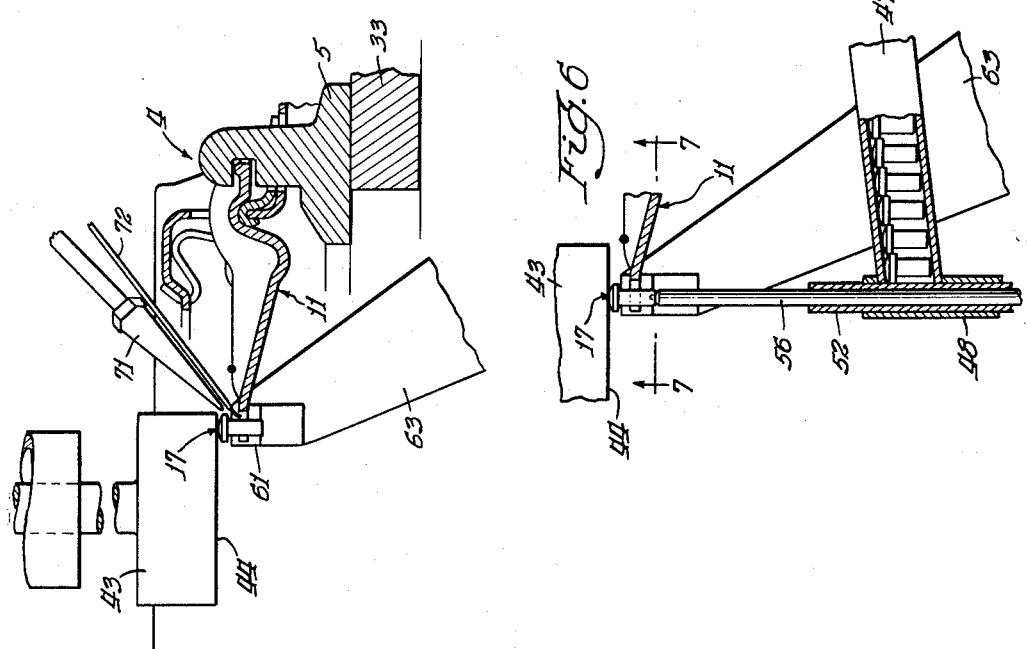
Inventor:
Daniel W. Lysett
By:
Donald W. Banner   Atty.

Nov. 6, 1962 D. W. LYSETT 3,061,922
METHOD OF CLUTCH ASSEMBLY
Filed Dec. 14, 1956 5 Sheets-Sheet 5
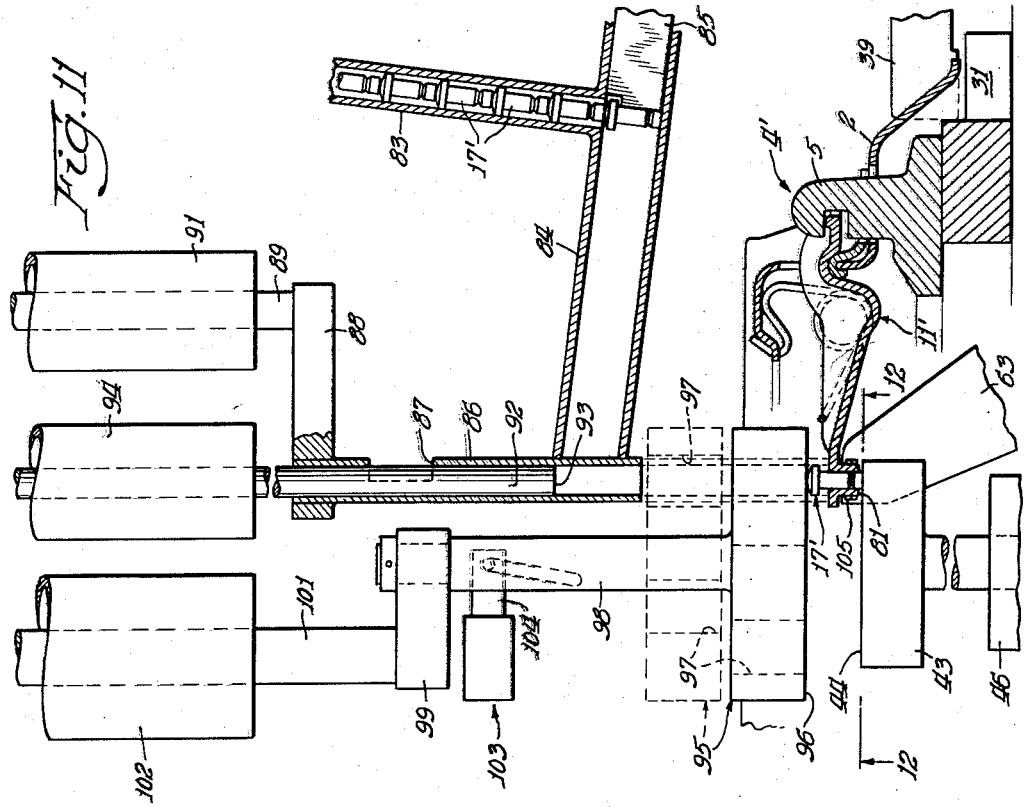
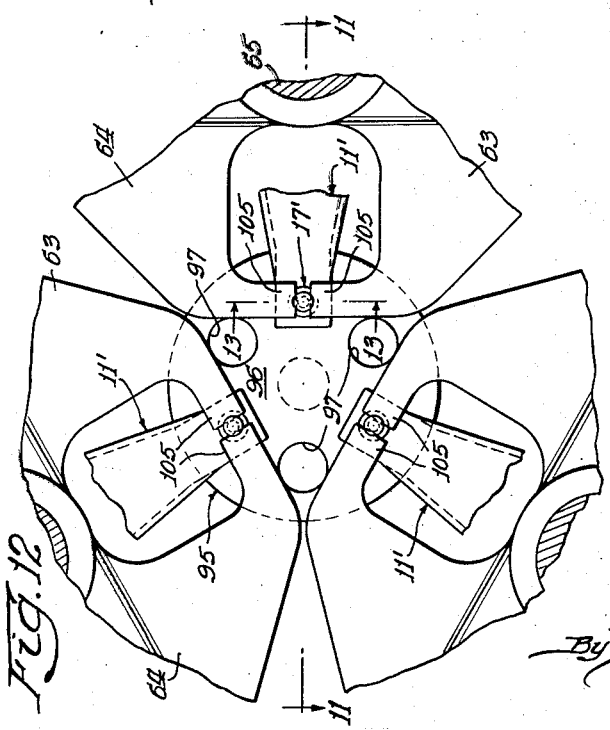
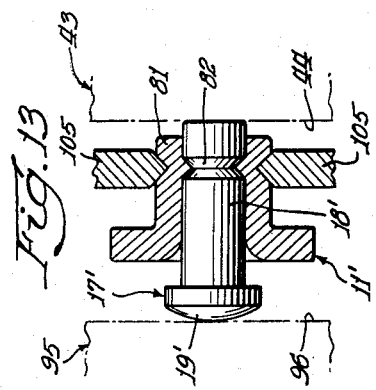
Inventor:
Daniel W. Lysett
By: Donald W. Banner Atty.

United States Patent Office 3,061,922
Patented Nov. 6, 1962

3,061,922
METHOD OF CLUTCH ASSEMBLY
Daniel W. Lysett, Utica, Mich., assignor to Borg-Warner Corporation, Chicago, Ill., a corporation of Illinois
Filed Dec. 14, 1956, Ser. No. 628,313
2 Claims. (Cl. 29—464)

This invention relates to an improvement in the method of manufacture of friction type clutches of the type employed in automotive vehicles, and more particularly to a method of precisely and rapidly affixing a plurality of "buttons" simultaneously to associated clutch release levers in such a manner that the heads of such "buttons" all are constrained to lie in a common plane.

It is well recognized that the release levers in an automotive vehicle clutch must have durable wearing surfaces provided near their respective inner terminal portions, and that their respective wear portions must all lie in a common plane so that when the release bearing associated with the clutch operates the release levers, the pressure plate will be maintained in a plane parallel to the flywheel so that excessive wear is eliminated, and the releasing of the clutch will be complete.

A variety of mechanisms have heretofore been employed, and a plurality of methods have been utilized, in an attempt to economically achieve coplanar disposition of these release lever portions. For example, attempts have been made to bend the release levers so that the inner terminal portions thereof lie in a common plane; more commonly, the release levers are provided with threaded apertures which respectively receive "buttons" or the like which are utilized as the wear surface of the lever. With such constructions, the clutch is assembled on a suitable assembly fixture, after which the clutch is compressed to its operating position and the buttons checked for height with a micrometer, or dial indicator, following which the buttons are individually rotated into position, again individually tested for height, and subsequently individually readjusted for proper height where necessary. Inasmuch as these adjustments are absolutely essential to ensure proper operation of the clutch assembly, such adjustments heretofore had to be carried out with great care and attendant expense.

One object of the present invention is the provision of a new and improved method which will eliminate a substantial amount of time previously consumed in the manufacture and essembly of the automotive type friction clutches.

Another object is the provision of a method in accordance with the preceding object which permits the skill required on the part of the assembler to be at a minimum.

Another object is the provision of a method in accordance with the preceding objects which will substantially reduce the time and cost required heretofore in the manufacture of automotive type friction clutches, but which will result in a clutch of superior operating characteristics.

Other objects and features of the invention will be readily apparent to those skilled in the art from the specification and appended drawings illustrating certain preferred embodiments in which:

FIGURE 3 is a schematic representation of apparatus constructed to carry out the method of the present invention;

FIGURE 4 is a view along the plane of line 4—4 of FIGURE 3;

FIGURE 5 is a view similar to FIGURE 3, with the parts shown in a moved position;

FIGURE 6 is a view similar to FIGURE 5, with the parts shown in a different position;

FIGURE 7 is an enlarged view along the plane of line 7—7 of FIGURE 6;

FIGURE 8 is a view similar to FIGURE 4 with the parts shown in a moved position;

FIGURE 9 is a view similar to FIGURE 7 showing the parts after the welding operation;

FIGURE 10 is a schematic representation of modified apparatus adapted to carry out the method of the present invention;

FIGURE 11 is a schematic representation of apparatus adapted to carry out a second modified form of the method of the present invention, the view being taken along the plane of line 11—11 of FIGURE 12;

FIGURE 12 is a sectional view taken along the plane of line 12—12 of FIGURE 11;

FIGURE 13 is an enlarged sectional view along the plane of line 13—13 of FIGURE 12.

Figure 1:
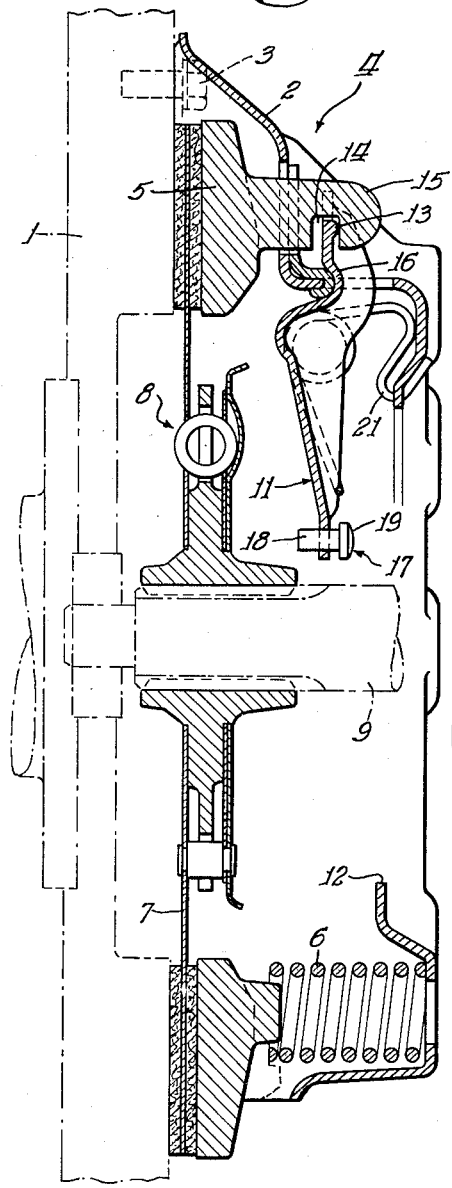
FIGURE 1 is a longitudinal sectional view through a device manufactured in accordance with the method described and claimed herein.
Figure 2:
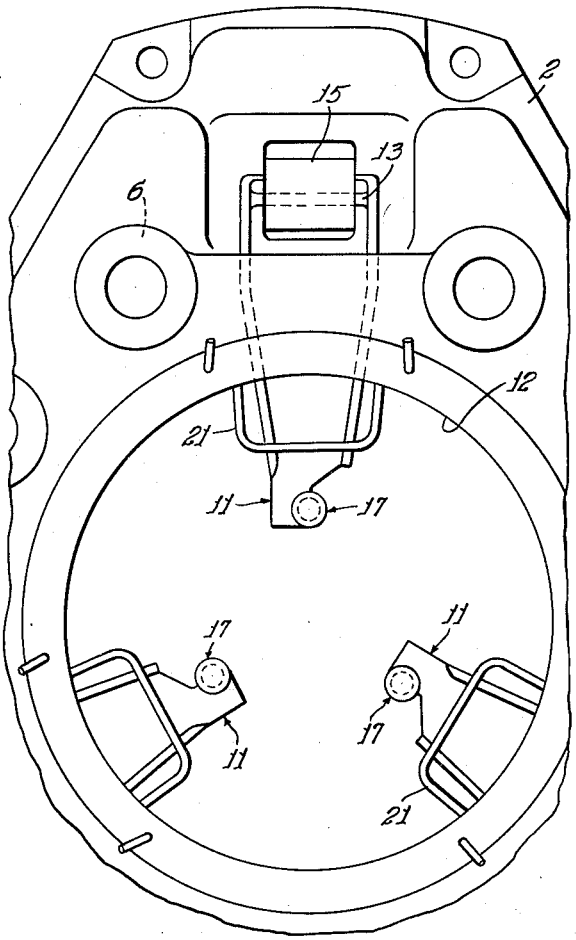
FIGURE 2 is a partial front elevational view of the device illustrated in FIGURE 1.

Attention is originally directed to FIGURES 1 and 2 which illustrate an automotive type friction clutch constructed in accordance with the method of the present invention; it should be noted, however, that the method described and claimed herein is not limited to utilization with this particular type clutch. The particular clutch illustrated in FIGURES 1 and 2 is of the type described and claimed by me in my copending patent application entitled "Friction Clutch," Serial No. 583,526, filed May 8, 1956, now Patent No. 2,895,581. As best illustrated in FIGURE 1, there is disclosed a flywheel 1 rotatable by the vehicle engine (not shown), to which there is fixedly mounted a cover plate 2, by a plurality of bolts 3, of the clutch mechanism indicated in general by the numeral 4. The clutch 4 comprises a pressure plate 5 biased toward the flywheel 1 by a plurality of pressure springs 6. Clampingly disposed between the pressure plate 5 and the flywheel 1 is a clutch plate 7 provided at its outer periphery with an annular friction facing on each side thereof, plate 7 also having suitable vibration damper means 8, and being splined to an output shaft 9. In order to release the pressure plate 7 from its clamping engagement between the flywheel 1 and the pressure plate 5, there are provided a plurality of circumferentially spaced release levers 11 having end portions which respectively project within a suitable circular opening 12 formed in the cover plate 2. Each of the release levers 11 is provided at its outer extremity with a force applying portion 13 which is received in a suitable opening 14 in a cooperating boss 15 integral with the pressure plate 5. An intermediate portion 16 is provided on each of the release levers 11 which is return bent and which is pivotally mounted upon the cover plate 2. At the innermost extremity of each of the release levers 11 there is provided a wear portion in the form of a button 17 fixedly mounted to the release lever 11, each button 17 comprising a shank portion 18 and a head portion 19, the outermost ends of the head portions 19 on each of the buttons 17 lying in a common plane. Spring means 21 are also provided between each of the release levers 11 and the cover plate 2.

It will be readily apparent to those skilled in the art that when the release bearing (not shown) is moved toward the pressure plate 5, it will engage these coplanar tips of the buttons 17 to simultaneously effect operation of all of the levers 11, which will therefore operate together to effect releasing action of the pressure plate 5 against the bias of the springs 6, to interrupt the connection between the clutch plate 7 and the flywheel 1. Upon return movement of the release bearing, the parts will once again assume the positions illustrated in FIGURES 1 and 2, the clutch plates 7 once again being clamped between the flywheel 1 and the pressure plate 5 so that torque is transmitted from the flywheel 1, through the clutch plate 7 to the driven shaft 9.

As previously indicated, it is highly desirable to utilize a method which is economical in manufacturing such clutch devices, which will also result in clutches which are durable and reliable. In FIGURE 3 there is disclosed schematically sufficient apparatus for carrying out such a method, this apparatus comprising an annular base plate 31 mounted upon a flat surface 32, the base plate 31 having an annular boss portion 33. The boss 33 has an annular upper surface 34, and disposed in engagement therewith is the annular flat surface of the pressure plate 5 which, when the device is installed in an automotive vehicle as illustrated in FIGURE 1, would engage the friction surface provided on the clutch plate 7. A plurality of clamping means 35 are provided each of which comprises a hydraulic cylinder 36 from which projects a piston rod 37 pivotally connected, as at 38, to a generally L-shaped clamp 39 adapted to engage the clutch cover 2 as described hereinafter, the clamp 39 being pivotally mounted at 41 to a fixed post 42. As previously described, a plurality of such clamping means 35 are provided around the periphery of the clutch device and are operatively associated with it in such a manner that, upon operation of the hydraulic cylinders 36 and movement of the clamps 39 from the position illustrated in dotted lines in FIGURE 3 to the position illustrated in full lines therein, the cover 2 of the clutch 4 is moved relative to the pressure plate 5 such that the levers 11 assume the normal position they will take when the device is installed in an automotive vehicle. More particularly, the levers 11 will each be positioned, under these circumstances with clamps 39 engaged, exactly as they will be when the device is installed in the vehicle in the manner illustrated in FIGURE 1; the cover plate 2 and the pressure plate 5 are in the same relative positions they will assume when the pressure plate 5 engages the friction material on the clutch plate 7, as illustrated in FIGURE 1.

Continuing the description of the apparatus in FIGURE 3, there is also provided a block 43, circular in configuration, having a flat inner surface 44 which, as illustrated in FIGURE 4, is adapted to overlie the ends of all of the release levers 11 of the device. The block 43 is movable through the opening 12 in the clutch cover 2 by a piston rod 45 operated by a hydraulic cylinder 46. The block 43 is so mounted that the surface 44 thereon is parallel to the surface 34 on the boss 33 of the base plate 31.

Although for the purposes of simplicity only one assemblage is illustrated in FIGURE 3, associated with each of the three release levers 11 is in assemblage which comprises a chute 47 adapted to feed buttons 17 from a suitable bin and orientation device (not shown) to a tube 48 fixedly mounted to a resiliently mounted block or plate 49. This plate 49 is provided with three openings 51, each of which receives an end portion of a tube 48 which is aligned with the end of a release lever 11 as previously described. Reciprocably disposed within each of the tubes 48 is a tube 52, the upper end of each of the three tubes 52 being fixedly connected to an arm 53, the three arms 53 being connected to a piston rod 54 projecting outwardly from, and operated by, a hydraulic cylinder 55 so that operation of the hydraulic cylinder 55 effects simultaneous vertical movement of the three tubes 52. Disposed within each of the tubes 52 for reciprocable movement therein is a rod 56; the ends of each of the three rods 56 are connected together for simultaneous rectilinear movement by a hydraulic cylinder 57. The uppermost end 58 of each of the rods 56 is provided with a conical shape, and it should be noted that the buttons 17 are each provided with a complementary depression in the shank ends thereof whereby the conical ends 58 on the rods 56 may be received therein.

As best illustrated in FIGURES 3 and 4, a pair of welding jaws 61 and 62 carried by arms 63 and 64, respectively, are provided, the jaws 61, 62 being carried at the ends of the levers 63, 64 respectively. The levers 63, 64 are pivotally mounted at 65; lever 63 has an end portion 66 pivotally connected at 67 to a hydraulic cylinder 68. Lever 64 has an end portion 69 pivotally connected at 71 to the hydraulic cylinder 68, which is of the type provided with pistons movable simultaneously outwardly or inwardly so that the levers 63 and 64 will rotate together. The levers 63 and 64 are so arranged that the jaws 61, 62 are vertically aligned with the inner portions of the associated clutch release levers 11, as illustrated in FIGURE 3.

As previously indicated the method of the present invention relates to simultaneously affixing the three buttons 17, as shown in FIGURE 2, to their associated clutch release levers 11 respectively in such a manner that the affixation of all of the buttons to their respective levers occurs simultaneously and at the same time the tips of the head portions 19 of all the buttons are coplanar. In carrying out this method with the apparatus described above, the block 43 is initially moved into position within the opening 12 in the clutch cover 2 by operation of the hydraulic cylinder 46, and the tubes 52 are simultaneously operated by the hydraulic cylinder 55 so as to be drawn downwardly, as shown in FIGURE 3, to permit a button 17 to pass from each of the chutes 47 into the associated tube 48. The shank portion 18 of each of the buttons 17 will drop into the associated tube 52, which is sufficiently large to permit this to happen, tube 52, however, engaging the underside of the head portion 19 of the button 17 to hold it, as illustrated in FIGURE 3. The rods 56 are all previously retracted by the hydraulic cylinder 57 sufficiently to permit the buttons 17 to fall into the tube 52, as illustrated in FIGURE 3. Hydraulic cylinders 55 and 57 are then operated to effect upward movement of the three tubes 52 and the three rods 56 until the head portions 19 on the three buttons 17 are all engaged with the flat surface 44 on the block 43. This condition is illustrated in FIGURE 5. The hydraulic cylinder 55 is then operated to effect a withdrawal of the three tubes 52, so that the three buttons 17 are then held in position against the block 43 by the rods 56 only. The three hydraulic cylinders 68 are then operated to move the welding jaws 61 and 62 toward each other. The jaws 62 will each engage a shank 18 of one of the buttons 17 while each of the jaws 61 will engage the side of the associated release lever 11, as illustrated in FIGURE 7. The rods 56, and the mounting of the plate 49, are of sufficient flexibility to permit the jaws 62 to move the shank portions 18 of the buttons 17 into engagement with the side of the associated release lever 11, as illustrated in FIGURE 7. Hydraulic cylinder 57 is then operated to withdraw the rods 56 from engagement with the buttons 17, the welding jaws 61 and 62 holding the buttons 17 sufficiently firmly to retain their engagement with the surface 44 on the block 43, so that the tips of the head portions 19 of the buttons 17 all lie in a common plane. Welding current from a suitable source (not shown) is then passed through the jaws 61 and 62, so that the shanks 18 of the buttons 17 are fused into the associated sides of the adjacent levers 11, substantially as illustrated in FIGURES 8 and 9. After a suitable "hold" period in the welding cycle, cylinders 68 are operated to return the welding jaws 61 and 62 to the position illustrated in FIGURE 4. It will be seen that a button 17 has been welded to each of the three clutch release levers 11; it will be seen that all of the buttons were so positioned simultaneously; and it will further be seen that the tips of each of the head portions 19 of the buttons 17 all lie in a common plane. The hydraulic cylinder 46 may then be operated to effect removal of the block 43 out of the opening 12 and to a position above the clutch 4, and the hydraulic cylinders 36 operated to release the clamps 39 to permit removal of the clutch 4 from the base plate 31, whereupon a new clutch may be positioned thereon and the cycle repeated.

It will be seen that with this method, individual adjustment and handling of the buttons is completely eliminated, inasmuch as all of the buttons are simultaneously attached to their associated release levers. Inasmuch as the tips of the head portions 19 of the buttons must of necessity lie in a common plane, there is no need to individually check the "height" of the individual buttons which is automatically accomplished by the positioning of the block 43.

Modified apparatus for carrying out the method of the present invention is illustrated in FIGURE 10. With this modified apparatus the parts previously described are all used, and the method is the same as that previously described, with the exception that welding current does not flow between the jaws 61 and 62 as in the previous apparatus. Rather, there is associated with each of the buttons 17 a torch 71 and a welding rod 72 which are moved into position by suitable hydraulically operable means when the rods 56 are retracted from the buttons 17. The torches 71 simultaneously melt portions of the rods 72 to fuse the buttons 17 to their associated release levers 11.

In FIGURES 11 through 13, there is shown further modified apparatus for carrying out the method of the present invention. This apparatus includes the base plate 31 previously described on which a clutch mechanism 4' is disposed in the manner above described, the clutch 4' differing from the clutch mechanism 4 previously described only in that the plurality of release levers 11' are each provided near their respective end portions with generally cup shaped portions 81 which have a central, circular opening extending therethrough adapted to receive the shank 18' of a button 17', identical with the previously described buttons 17 except for the provision of an annular notch 82 in the shank 18'. Also employed is the block 43 having the surface 44 overlying the ends of all of the release levers 11' as previously described, the block 43 being operated by the afore described hydraulic cylinder 46. As illustrated in FIGURE 11, there also is provided for each of the three clutch release levers a generally vertical chute 83 adapted to convey the button 17' from a suitable storage and orientation means (not shown), the button 17' being fed to a chute 84, within which is disposed a reciprocable ram 85 adapted to convey the buttons 17 individually to the assembly mechanism described hereinafter. This assembly mechanism comprises a tube 86 having an opening 87 therein through which the buttons 17' may individually pass upon operation of the ram 85 when the tube 86 is properly positioned. The three tubes 86, one associated with each of the release levers 11', are all fixedly mounted to a common lever mechanism 88 adapted to be operated in a rectilinear manner by a piston rod 89 attached to a hydraulic cylinder 91. It will be obvious that operation of the hydraulic cylinder 91 will effect rectilinear movement of the three tubes 86 to align the openings 87 therein with the three chutes 84, respectively, provided therefor whereby the buttons 17' may be fed into the tubes 86 by the rams 85. The proportioning of the length of the tubes 86 to the positioning of the openings 87 therein is such that when the openings 87 in the tubes 86 are aligned with their respective chutes 84, the lowermost end of the tubes 86 are flush with the upper surfaces of the release levers 11'.

Reciprocably mounted within each of the tubes 86 is a rod 92 having a flat, lower surface 93 provided thereon, the three rods 92 being connected for common vertical movement by hydraulic cylinder 94.

There is also provided a block 95, generally annular in configuration, provided with a flat surface 96 adapted to overlie all of the ends of the release levers 11', surface 96 being parallel to surface 44 on the block 43. Block 95 is provided with three openings 97 extending therethrough spaced 120° apart through which the tubes 96 and the rods 92 may pass, as will be described hereinafter. The block 95 is movable from the dotted line position illustrated in FIGURE 11 to the full line position illustrated therein by a rod 98 rotatably mounted in an arm 99 connected to a rod 101 adapted for vertical movement by a hydraulic cylinder 102. Also provided is an indexing mechanism 103 having a horizontal arm 104 provided with a detent which is disposed within an elongated curved slot extending generally axially of the rod 98 to effect rotation of the rod through an arc of approximately 60° as the hydraulic cylinder 102 effects vertical movement of the rod 98 between the dotted and full line positions illustrated in FIGURE 11.

The pair of levers 63 and 64, as previously described, pivotally mounted and operable by a hydraulic cylinder 68, are provided in association with each of the release levers 11'. The ends of levers 63 and 64 adjacent the levers 11' however, are provided with staking tools 105 for a purpose to be subsequently described.

In the operation of the apparatus illustrated in FIGURES 11 through 13, the clamps 39 are initially operated, as previously described, to move the release levers 11' to the position they will normally occupy when they are installed in the vehicle. The hydraulic cylinder 46 is operated to move the block 43 upwardly to the position illustrated in FIGURE 11. At this time the block 95 occupies the position illustrated in dotted lines in FIGURE 11, and the openings in the block 95 are aligned with the tubes 86. The hydraulic cylinder 91 is then operated to effect downward movement of the three tubes 86 until their lower portions are flush with the upper surfaces of the three release levers 11', respectively. At this position of the tubes 86, the openings 87 therein will be respectively aligned with the chutes 84, and the rams 85 are operated to each move one of the buttons 17' into each of the openings 87. The buttons 17' will therefore pass through the openings 87 in the tubes 86, following which the hydraulic cylinder 94 is actuated to effect downward movement of the rods 92. The flat ends 93 on the rods 92 are move downwardly until they engage the upper head portions 19' of the three buttons 17', forcing the buttons 17' into the extruded cups 81 on the release levers 11' until the lower, flat end surfaces of the shank 18' are in engagement with the surface 44 on the block 43. The cylinders 91 and 94 are then operated to retract the tubes 86 and the rods 92, respectively, to the position illustrated in FIGURE 11, and the rams 85 is moved to the position illustrated in FIGURE 11. Hydraulic cylinder 102 is then operated to move the block 95 from the dotted line position in FIGURE 11 toward the full line position therein, the indexing mechanism 103 operating to effect rotation of the block 95 through approximately an arc of 60°. The openings 97 in the block 95 will therefore be positioned, as illustrated in FIGURE 12, approximately 60° from the nearest button 17'. When the block 95, therefore, finally reaches the full line position illustrated in FIGURE 11, the flat surface 96 thereon will engage all of the buttons 17', which are therefore clamped between the flat surfaces on the block 43 and the block 95. It should be noted that the tips of all of the head portions 19' of the buttons 17' will therefore be disposed in a common plane. The hydraulic cylinders 68 respectively associated with each pair of arms 63, 64 are then operated to move the staking tools 105 into engagement with the side surfaces of the extruded cup portions 81 on the release levers 11'. Preferably, the staking tools 105 are located from the block 43 and will therefore be aligned with the notch 82 in the button 17', forcing material from the extruded cups 81 into the associated notch 82 so that the buttons 17' are mechanically fixedly mounted to their respective, associated release levers 11'. The hydraulic cylinder 102 is then operated to retract the block 95 from the full line position illustrated in FIGURE 11 to the dotted line position illustrated therein, the indexing mechanism 103 effecting rotation of the block 95, as it moves upwardly, to once again realign the openings 97 therein with the tubes 86. Hydraulic cylinder 46 is then operated to move the block 43 downwardly away from the buttons 17' and the hydraulic cylinder 68 operated to release the staking tools 105 from the cups 81. Clamps 39 are then operated by their associated hydraulic cylinders 36 to permit the clutch cover 2' to move under the bias of the pressure springs, relative to the pressure plate 5.

It will be seen that with the method of the present invention, in all of its described embodiment, all of the buttons are simultaneously moved into position relative to their respective release levers simultaneously, that such buttons are simultaneously affixed to their respective release levers, and that the operating tips of all of the buttons will be in a common plane. This method of clutch assembly in mass production results in very substantial cost savings, inasmuch as it is unnecessary to individually handle, check and adjust the "height" of the plurality of buttons employed.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. The method of vehicle clutch manufacture which comprises the steps of assembling the clutch cover, the pressure plate, the pressure springs and a plurality of release levers into a subassembly, effecting relative movement between the clutch cover and pressure plate against the bias of the pressure springs until the release levers occupy the normal position relative to the clutch cover and pressure plate which they occupy when installed in a vehicle, simultaneously positioning a plurality of buttons respectively contiguous to the release levers with an end portion of each button positioned in a common plane with the comparable end portion of each of the other buttons, simultaneously clamping said buttons respectively to their associated release levers, and subsequently simultaneously affixing said buttons respectively to their associated release levers.

2. The method of vehicle clutch manufacture which comprises the steps of assembling the clutch cover, the pressure plate, the pressure springs and a plurality of release levers into a subassembly, effecting relative movement between the clutch cover and pressure plate against the bias of the pressure springs until the release levers occupy the normal position relative to the clutch cover and pressure plate which they occupy when installed in a vehicle, simultaneously positioning a plurality of buttons respectively contiguous to the release levers with an end portion of each button positioned in a common plane with the comparable end portion of each of the other buttons, simultaneously mechanically forcing said buttons respectively into tight engagement with their associated release levers, and subsequently simultaneously welding said buttons respectively to their associated release levers.

References Cited in the file of this patent

UNITED STATES PATENTS

| | | |
|---|---|---|
| 1,541,513 | Knoop | June 9, 1925 |
| 1,773,410 | Selah | Aug. 19, 1930 |
| 1,876,811 | Whitworth | Sept. 13, 1932 |
| 1,881,934 | Powis | Oct. 11, 1932 |
| 2,021,973 | Wemp | Nov. 26, 1935 |
| 2,230,520 | Wemp | Feb. 4, 1941 |
| 2,677,875 | White et al. | May 11, 1954 |
| 2,774,051 | McCarthy | Dec. 11, 1956 |